US007753980B2

(12) United States Patent
Kobayashi et al.

(10) Patent No.: US 7,753,980 B2
(45) Date of Patent: Jul. 13, 2010

(54) AIR CLEANER

(75) Inventors: Yasutaka Kobayashi, Akashi (JP); Kohei Kuyama, Kobe (JP); Kiyohito Takano, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 828 days.

(21) Appl. No.: 11/114,119

(22) Filed: Apr. 26, 2005

(65) Prior Publication Data

US 2005/0241608 A1 Nov. 3, 2005

(30) Foreign Application Priority Data

Apr. 30, 2004 (JP) ............................ 2004-135919

(51) Int. Cl.
*B01D 39/00* (2006.01)
*B01D 50/00* (2006.01)
*B01D 59/50* (2006.01)

(52) U.S. Cl. ......................... 55/495; 55/493; 55/385.3; 55/315

(58) Field of Classification Search .................. 55/495, 55/493, 385.3, 315
See application file for complete search history.

(56) References Cited

U.S. PATENT DOCUMENTS 2,069,379 A * 2/1937 Moe ............................ 55/330
3,451,584 A * 6/1969 Degaetano .................. 220/371
3,722,182 A * 3/1973 Gilbertson ..................... 96/52
4,219,901 A * 9/1980 Burgoon et al. ............... 15/352
4,233,043 A * 11/1980 Catterson ..................... 55/315
4,274,330 A * 6/1981 Witten et al. ................ 454/276
4,482,365 A * 11/1984 Roach ......................... 96/408
4,907,552 A * 3/1990 Martin ................... 123/198 E
5,918,576 A * 7/1999 Ohoka et al. ............. 123/198 E
6,015,444 A * 1/2000 Craft et al. .................... 55/320
6,099,608 A * 8/2000 Harms et al. .................. 55/400
6,840,973 B2 * 1/2005 Kuji et al. .................. 55/385.3
6,854,157 B2 * 2/2005 Strauser ..................... 15/340.4
6,884,274 B2 * 4/2005 Niakan et al. ................. 55/486
7,128,643 B2 * 10/2006 Beliveau et al. ............. 454/276
2004/0020003 A1 * 2/2004 Strauser ..................... 15/340.3

FOREIGN PATENT DOCUMENTS

JP A-2001-221113 8/2001
JP A-2003-286916 10/2003

* cited by examiner

*Primary Examiner*—Walter D Griffin
*Assistant Examiner*—Amber Orlando
(74) *Attorney, Agent, or Firm*—Oliff & Berridge, PLC

(57) ABSTRACT

The present air cleaner includes: a cleaner case having a bottom wall, a circumferential side wall provided with an air inlet in its lower part, and a support wall formed on the bottom wall inside the circumferential side wall; and a cylindrical cleaner element supported on an upper end portion of the support wall. An air chamber is defined by the cleaner case, the support wall, and the cleaner element so as to surround the cleaner element and the support wall. A bottom of the cleaner element is inclined at an angle to the bottom wall of the cleaner case so that a distance between the bottom wall of the cleaner case and the bottom of the cleaner element increases from a side opposite to the air inlet toward an air inlet side.

17 Claims, 11 Drawing Sheets

AIR CLEANER

CROSS REFERENCE TO RELATED APPLICATIONS

This application is based upon and claims the benefit of priority from the prior Japanese Patent Application No. 2004-135919, filed on Apr. 30, 2004, the entire contents of which are incorporated herein by reference.

BACKGROUND OF THE INVENTION

1. Field of the Invention

The present invention relates to an air cleaner suitable mainly for use in combination of an engine mounted on a straddle-type vehicle such as a straddle-type four-wheel vehicle or a motorcycle.

2. Description of the Related Art

FIG. 10 shows a known air cleaner 100 for a vehicle (JP-A 2003-286916). The air cleaner 100 has a cleaner case 101 formed by joining together an upper case member 102 and a lower case member 103. A support wall 104 having the shape of a deformed cylinder is formed on the bottom wall 103*a* of the lower case member 103. A filter assembly 105 including a cleaner element 106 is supported on the support wall 104. An air intake port 110 is formed integrally with the side wall of the lower case member 103. An air outlet port 111 to be connected to an air intake pipe of a carburetor is formed on the bottom wall 103*a* of the lower case member 103.

The filter assembly 105 has a lower holder 112, an upper holder 113 and a top lid 114 formed integrally with the upper holder 113. The cleaner element 106 having the shape of a deformed cylinder is put on the outside of the upper holder 113.

The support wall 104 has the shape of a deformed cylinder similar to the shape of the cleaner element 106 as shown in FIG. 11 in a plan view. The support wall 104 is formed in a fixed height H1 from the bottom wall 103*a* as shown in FIG. 10 and extends from a position near the air intake port 110 to a position opposite to the position of the air intake port 110. Therefore, the lower end surface of the filter assembly 105 is at a fixed height H2 from the bottom wall 103*a* and hence the lower end surface of the filter assembly 105 is substantially parallel to the bottom wall 103*a*.

The support wall 104 is formed in the lowest possible height H1 to form the air cleaner 100 in the lowest possible vertical dimension and to form the cleaner case 101 in a volume capable of holding the cleaner element 106 having a large filtration area.

A deflecting wall 119 is disposed opposite to the inlet of the air intake port 110 to avoid induced air taken through the air intake port 110 into the cleaner case 101 directly and locally impinging on a front part of the cleaner element 106. The deflecting wall 119 separates water and mud from the induced air to prevent clogging the cleaner element 106.

In the air cleaner 100 shown in FIG. 10, the deflecting wall 119 changes the flowing direction of the induced air sharply upward so that the induced air may flow into a space over the filter assembly 105. Then, the induced air spreads into a space surrounding the cleaner element 106 and penetrates the cleaner element 106.

FIG. 12 shows another air cleaner for a vehicle (JP-A 2001-221113). A cleaner case 201 has a bottom wall 201*a* and a high, cylindrical support wall 202 formed integrally with the bottom wall 201*a*. A flat cleaner element 203 is supported on the support wall 202. The outside of the support wall 202 is opposed to an air inlet 205. Induced air impinges on a front end part of the support wall 202. The support wall separates water and mud from the induced air and changes the flowing direction of the induced air sharply upward so that the induced air may flow into a space over the cleaner element 203. The induced air flows down through the cleaner element 203.

The cleaner case 201 shown in FIG. 12 is mounted on a straddle-type four-wheel vehicle as shown in FIG. 13. In the straddle-type four-wheel vehicle, a carburetor 211 and the cleaner case 201 are stacked on an engine 210 as shown in FIG. 13. The cleaner case 201 is disposed between a steering shaft 213 on the front side of the cleaner case 201, and a seat 215 behind the cleaner case 201. Any space for disposing a fuel tank is unavailable over the cleaner case 201 thus disposed. Therefore, the fuel tank is disposed, for example, in a rear part of a body frame and the cleaner case 201 is covered with a decorative cover 220. The opposite sides of the carburetor 211 and the cleaner case 201 are covered with side covers 222.

The air cleaner shown in FIGS. 10 and 11 and the air cleaner shown in FIG. 12 make the induced air impinge on the deflecting wall 119 and the support wall 202 and deflect the flowing direction of the induced air sharply upward. Consequently, those air cleaners increase air flow resistance and have difficulty in uniformly distributing the induced air over the surfaces of the cleaner elements. Since the deflecting wall 119 and the support wall 202 form liquid separating chambers, respectively, the cleaner cases are inevitably large. When the cleaner case is formed in a small size, the cleaner element needs to be formed in a limited size inevitably having a small filtration area. Particularly, when a flat cleaner element as shown in FIG. 12 is used, the cleaner case must be inevitably formed in a large size to use a flat cleaner element having a large filtration area because the flat cleaner element naturally has a small filtration area as compared with that of the cylindrical cleaner element as shown in FIG. 11.

When the straddle-type four-wheel vehicle is provided with the decorative cover extending over the cleaner case 201 as shown in FIG. 13, the decorative cover 220 must be opened to open the cleaner case 201 when the cleaner element held in the cleaner case 201 needs to be changed. Thus the change of the cleaner element requires much work.

SUMMARY OF THE INVENTION

Accordingly, it is an object of the present invention to provide an air cleaner capable of separating water and mud contained in air from induced air before the induced air reaches a cleaner element, of exerting low air flow resistance on the induced air to enable the induced air to flow smoothly, of distributing induced air substantially uniformly over a cleaner element, of using a cleaner element having a large filtration area without using a large cleaner case and facilitating work for changing a cleaner element.

The present invention provides an air cleaner including: a cleaner case having a bottom wall, a circumferential side wall provided with an air inlet in its lower part, and a support wall formed on the bottom wall inside the circumferential side wall; and a cylindrical cleaner element supported on an upper end portion of the support wall. An air chamber is defined by the cleaner case, the support wall, and the cleaner element so as to surround the cleaner element and the support wall. A bottom of the cleaner element is inclined at an angle to the bottom wall of the cleaner case so that a distance between the bottom wall of the cleaner case and the bottom of the cleaner element increases from a side opposite to the air inlet toward an air inlet side.

Air induced through the air inlet formed in the lower part of the side wall of the cleaner case flows into the air chamber surrounding the support wall and impinges on the support wall. Consequently, water and mud contained in the induced air are separated from the induced air, the induced air spreads over the air chamber surrounding the support wall and flows smoothly along the bottom wall into the air chamber surrounding the cleaner element. Thus the induced air flows through the substantially entire side surface of the cleaner element into a space surrounded by the cleaner element.

Therefore, the flowing direction of the induced air is changed moderately, and a part of an air passage near the support wall, on which the induced air impinges, disposed near the air inlet is formed in a large sectional area to reduce air flow resistance. Since water and mud can be removed before the induced air reaches the cleaner element, the cleaner element can be prevented from being clogged. The air chamber defined by the outer surfaces of the cleaner element and the support wall and the inner surface of the cleaner case is useful for substantially uniformly distributing the induced air over the cleaner element and hence the cleaner element is able to filter the induced air efficiently. Since any special deflecting wall for defining a liquid separating chamber is not necessary, the air cleaner has a large filtration area for the size of the cleaner case.

In the air cleaner according to the present invention, it is preferable that most part of the air inlet is opposed to the support wall.

Since the support wall is disposed opposite to the air inlet, most part of the induced air impinges on the support wall immediately after passage through the air inlet, water and mud can be efficiently removed.

In the air cleaner according to the present invention, it is preferable that the cleaner case has a sectional shape substantially resembling a trapezoid having a long base on the air inlet side and a short base on the side opposite to the air inlet.

Since the cleaner case has a sectional shape substantially resembling a trapezoid having a long base on the air inlet side and a short base on the side opposite to the air inlet, an upper part, in which the cleaner element is disposed, of the interior space of the cleaner case and a lower part, defined by the bottom wall of the cleaner case and the inclined bottom surface of the cleaner element, of the interior space of the cleaner case can be efficiently used.

In the air cleaner according to the present invention, it is preferable that a bottom wall of the air chamber is set substantially horizontally.

When the cleaner case having the sectional shape substantially resembling a trapezoid is disposed with its bottom wall set substantially horizontally, the air cleaner can be stably disposed in a limited space over the carburetor of a vehicle.

In the air cleaner according to the present invention, it is preferable that an upper part of the air cleaner is exposed in an upper part of a body frame of a vehicle so as to form a part of an external shape of the vehicle.

When the upper part of the air cleaner is exposed in an upper part of the body frame of a vehicle so as to constitute part of the aesthetically designed external shape of the vehicle, the air cleaner can be formed in a comparatively high overall height. Consequently, the air cleaner can be provided with a cleaner element having a large filtration area and high filtration ability (cleaning ability) or the air cleaner can be disposed at an elevated position. Thus, the air inlet can be opened at an elevated position to enhance dustproof and waterproof effects. Since the air cleaner enables the omission of the decorative cover, the cleaner element of the air filter can be easily changed without requiring any additional work.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

General Construction of Vehicle

Figure 1:
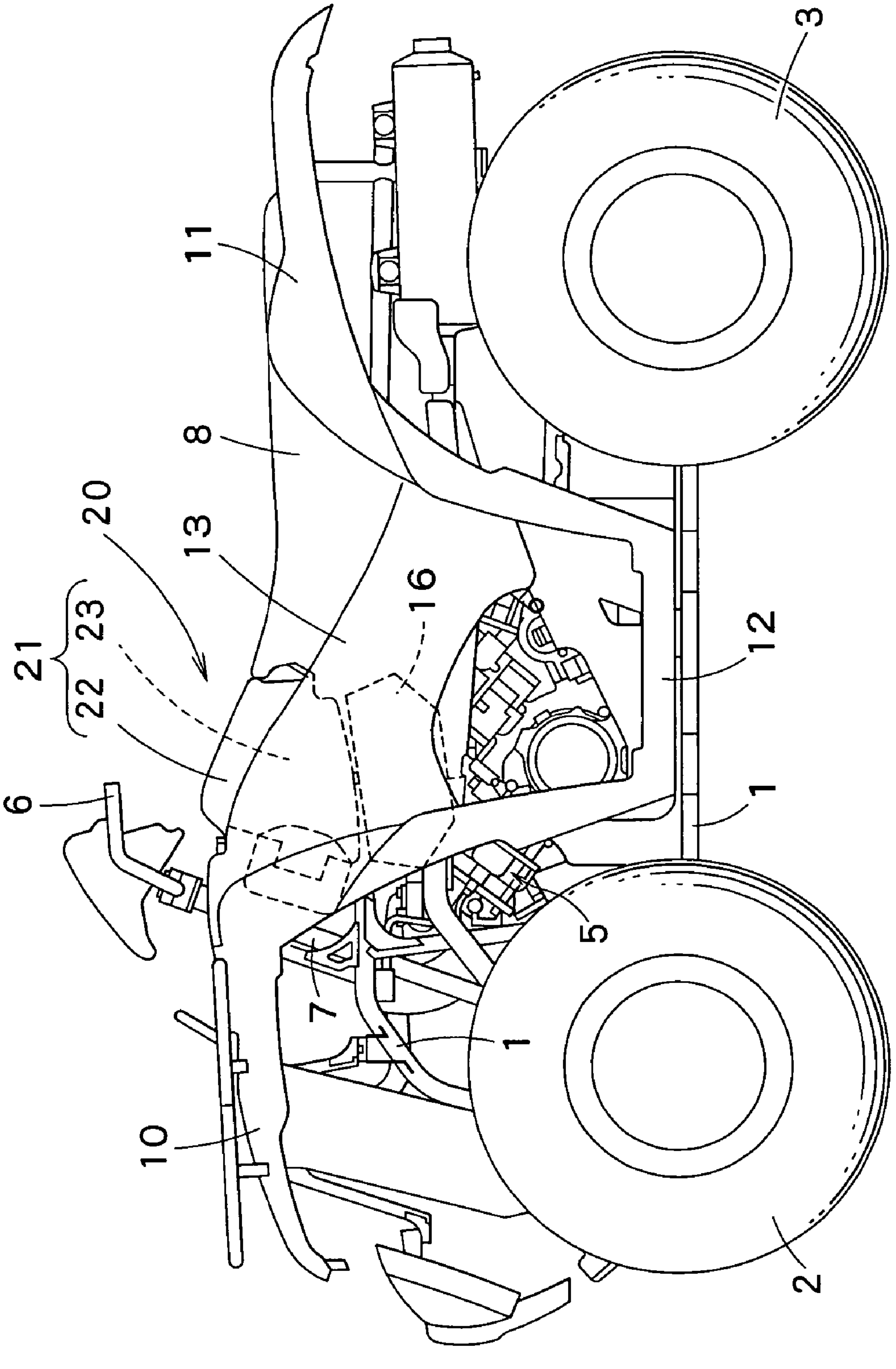
FIG. 1 is a side elevation of a straddle-type four-wheel vehicle provided with an air cleaner in a preferred embodiment according to the present invention taken from the left side of the straddle-type four-wheel vehicle.

Referring to FIG. 1 showing an all-terrain straddle-type four-wheel vehicle provided with an air cleaner 20 in a preferred embodiment according to the present invention, right and left front wheels 2 and right and left rear wheels 3 are suspended from a front part and a rear part, respectively, of a body frame 1, and an engine 5 is supported on the body frame 1 in a space between the front wheels 2 and the rear wheels 3. A steering shaft 7 is disposed in front of the engine 5. A steering handlebar 6 is attached to the upper end of the steering shaft 7. A seat 8 is disposed at an elevated position behind the engine 5. Front fenders 10 and rear fenders 11 are extended over the front wheels 2 and the rear wheels 3, respectively. Foot boards 12 are disposed on the right and the left side, respectively, of the lower end of the engine 5. The right and the left side of an upper part of the engine 5 are covered with side covers 13, respectively.

The engine 5 is a V engine having two banks set at an angle. A carburetor 16 is placed between the two banks. A cleaner case 21 included in the air cleaner 20 is extended in the back-and-forth direction above the carburetor 16 between the steering shaft 7 and the seat 8.

External Construction of Air Cleaner

The cleaner case 21 is formed by joining together an upper case member 22 and a lower case member 23. The lower case member 23 and the carburetor 16 are covered with the right and the left side covers. The upper case member 22 protrudes upward from a plane containing the upper edges of the right and the left side covers 13 so as to be exposed. The upper surface of the upper case member merges smoothly into the upper surface of the seat 8. Thus the upper case member 22 and the seat 8 are decorative components designed to form part of the external shape of the vehicle.

Figure 2:
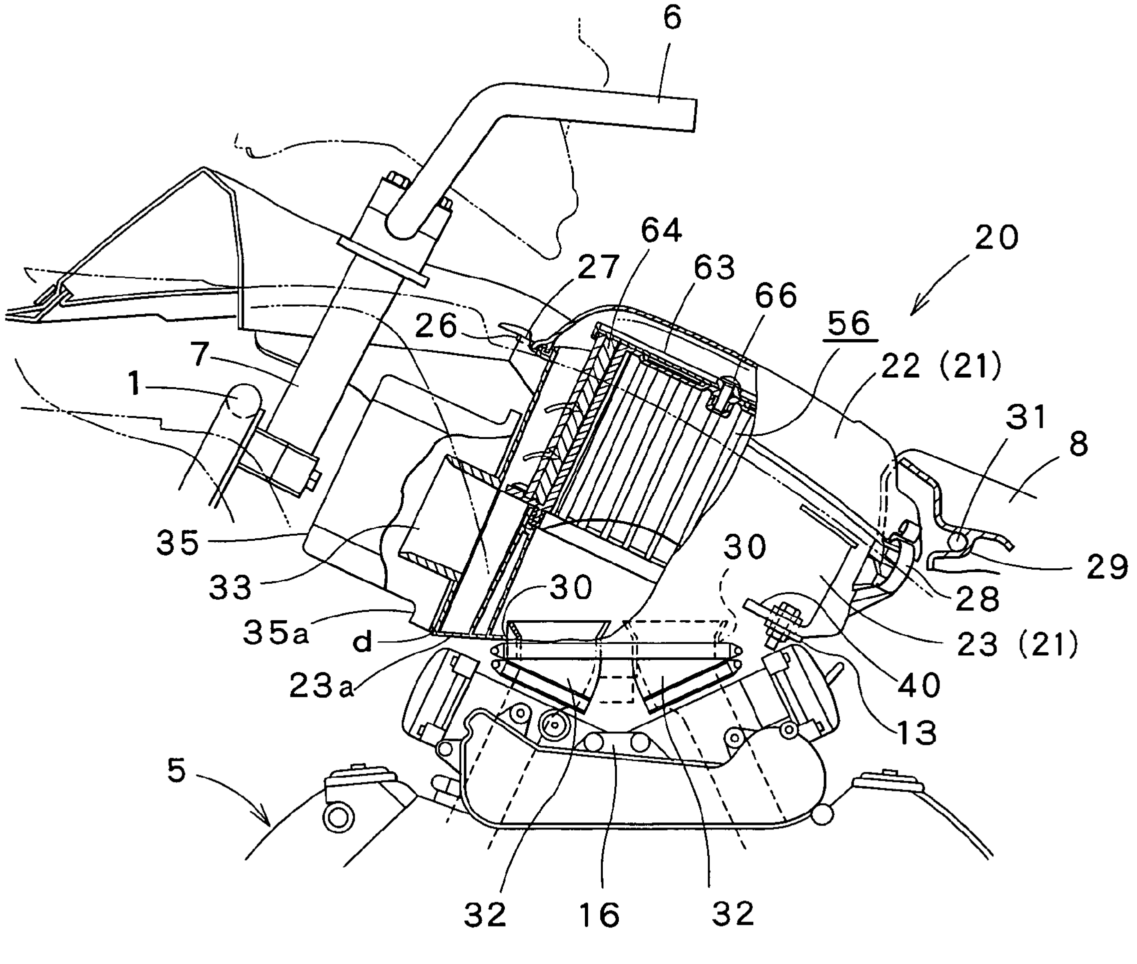
FIG. 2 is a side elevation, partly in vertical section, of the air cleaner shown in FIG. 1 and devices associated with the air cleaner.

Referring to FIG. 2, a filter assembly 56 is held in an upper half part of the lower case member 23. A locking projection 26 is formed integrally with the upper case member 22 so as to project forward from the front end of the upper case member 22. A locking hole 27 is formed in a front end part of the lower case member 23. The locking projection 26 is inserted in the locking hole 27 from behind the locking hole 27. Respective rear end parts of the case members 22 and 23 are separably clamped together with a pair of left and right clamping members 28. A front end part of the seat 8 extends over the upper, the right and the left side of the rear end parts of the case members 22 and 23 clamped by the clamping members 28 so as to cover the rear end parts of the case members 22 and 23 such that the rear end parts of the case members 22 and 23 are concealed from view.

The outward appearance of the vehicle is not ruined even if the upper part of the cleaner case 21 is used as a member constituting a part of the outward appearance of the vehicle since the rear end parts of the case members 22 and 23 and the clamping members 28 are concealed from view by the front end part of the seat 8.

Moreover, operations for attaching and detaching the upper case member 22 is easy since the upper case member 22 is connected to the lower case member 23 by the insertion system including the locking projection 26 and the locking hole 27 at the front end thereof and by the clamping members 28 at the rear end thereof.

The seat is provided with a hook 29 in the front end part thereof. The hook 29 engages with a bar 31 attached to the body frame 1. The rear end part of the seat 8 is releasably locked to the body frame 1 by a locking mechanism, not shown. The seat 8 can be removed from the body frame 1 by releasing the rear end part thereof from the locking mechanism.

In a vertical plane, the lower case member 23 has a trapezoidal shape having a front side of a vertical dimension greater than that of a back side. The lower case member 23 is disposed above the carburetor 16 with its bottom wall **23*a* substantially horizontally extended. Front and rear air outlet ports 30 are formed on the bottom wall 23*a*. The air outlet ports 30 are connected to air intake pipes 32 for the front and the rear cylinder of the engine 5 of the carburetor 16, respectively. An inlet port 33 opening toward the front projects forward from a front, lower part of the lower case member 23. An air intake case 35 is disposed in front of the cleaner case 21 so as to cover the inlet port 33 of the air cleaner. The air intake case 35 has an open rear end 35*a* and is formed in the shape of a cup. A gap d is formed between the end surface of the open rear end 35*a* and a part of the outer surface, corresponding to the open rear end 35*a*, of the side wall of the lower case member 23**.

Figure 3:
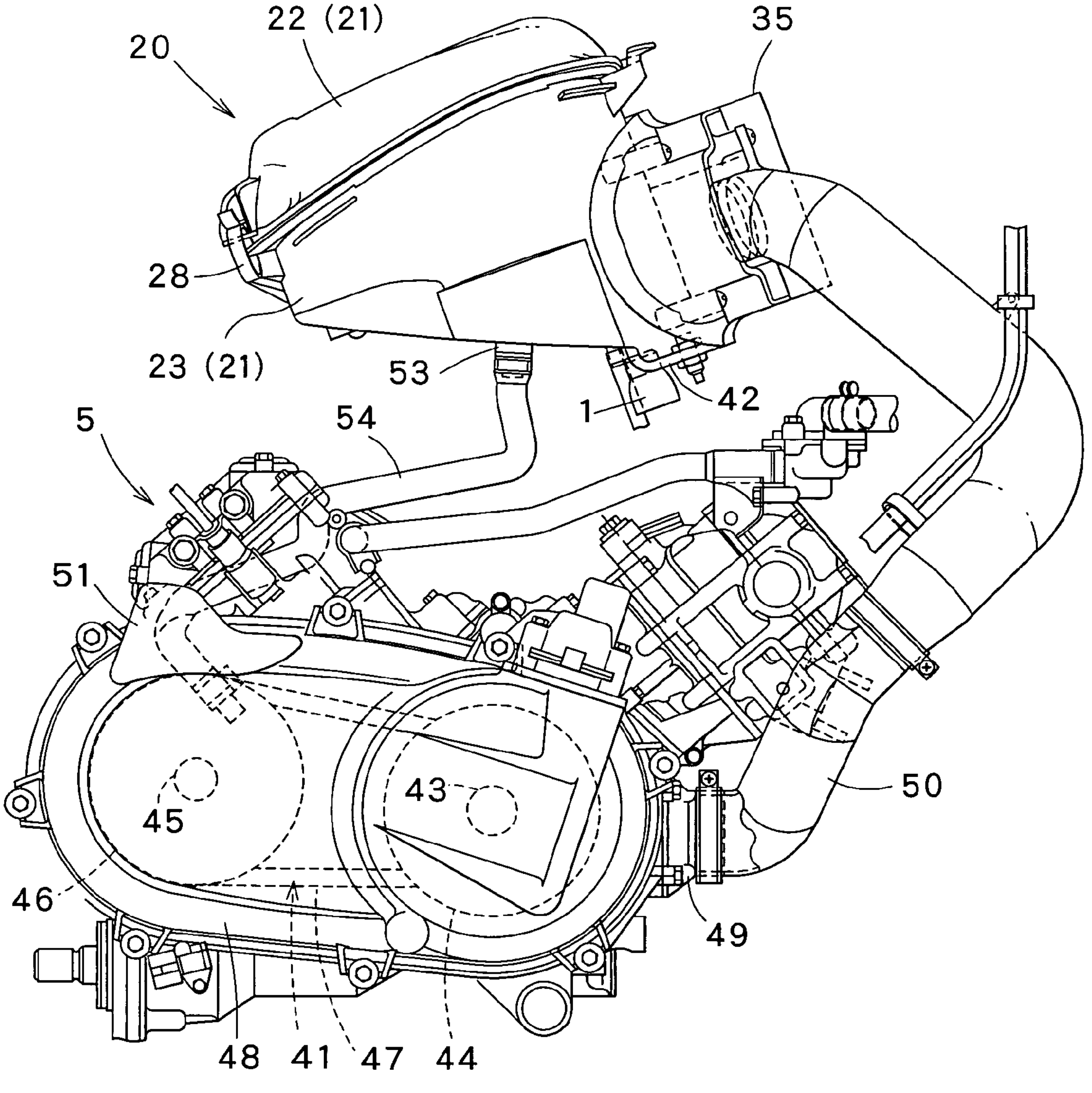
FIG. 3 is a side elevation of an engine and the air cleaner shown in FIG. 1, taken from the right side of the air cleaner.

A bracket 40 formed in, for example, a rear part of the left side surface of the lower case member 23 is fastened to a bracket attached to the side cover 13, and a bracket 42 formed in a front end part of the right side surface of the lower case member 23 is fastened to the body frame 1 as shown in FIG. 3.

Referring to FIG. 3 showing the engine 5 and the air cleaner 20 in a side elevation taken from the right side of the vehicle, a V-belt continuously variable transmission 41, namely, a transmission, is joined to the right side surface of the engine 5. The transmission 41 includes a drive pulley 44 interlocked with the output shaft 43 of the engine 5, a driven pulley 46 mounted on the input shaft 45 of a gear transmission (not shown), and a V belt 47 extended between the pulleys 44 and 46. The drive pulley 44, the driven pulley 16 and the V belt 47 are covered with a belt cover 48. A cooling air intake port 49 is formed on a front end part of the belt cover 48. The cooling air intake port 49 is connected to the air intake case 35 by an air intake duct 50 for taking in a cooling air. A cooling air discharge port 51 projects upward from a rear end part of the belt cover 48. A breather port 53 projects from the lower surface of the lower case member 23 of the cleaner case 21. The breather port 53 communicates with the interior of the engine 5 by means of a breather pipe 54.

Internal Construction of Air Cleaner

Figure 4:
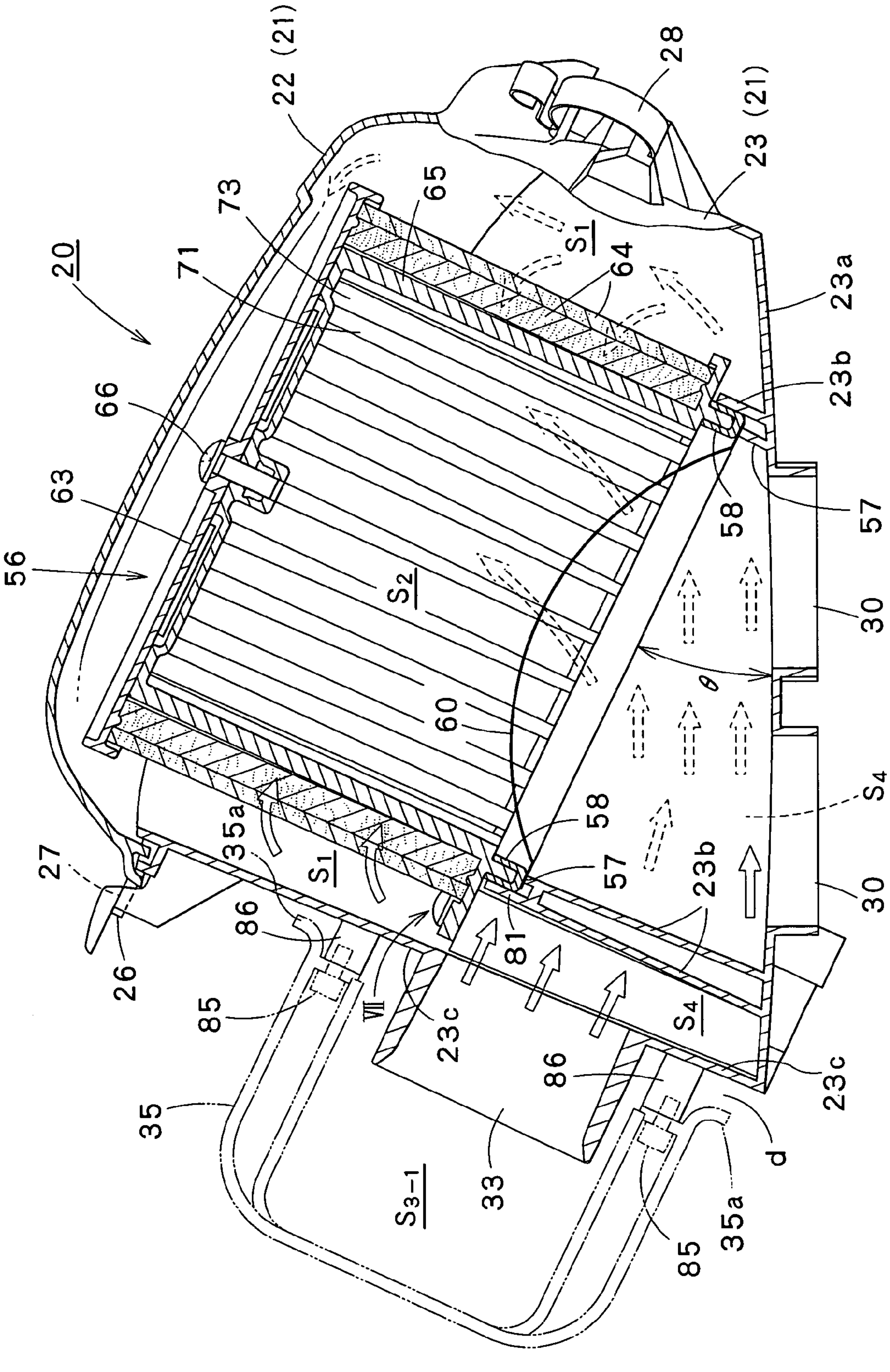
FIG. 4 is an enlarged vertical sectional view of the air cleaner shown in FIG. 1 taken from the left side of the air cleaner.

Referring to FIG. 4 showing the air cleaner 20 in a vertical sectional view taken from the left side, a cylindrical support wall **23*b* is formed integrally with the bottom wall 23*a* of the lower case member 23 so as to rise obliquely upward from the bottom wall 23*a*. An installation seat 57 is formed at the upper end of the support wall 23*b*. The filter assembly 56 is seated on the installation seat 57 through a rubber trim seal 58. A peripheral part of a flame arrester 60 formed from a wire net is held between the installation seat 57 and the trim seal 58. A central part of the flame arrester 60 is formed in an upward convex spherical shape. The cylindrical support wall 23*b* is a double-wall structure rising obliquely backward substantially parallel to the front end surface 23*c* of the lower case member 23*a*. The installation seat 57 formed at the upper end of the support wall 23*b* is inclined at an angle θ to a horizontal plane such that the installation seat 57 slopes down backward. The front end part of the support wall 23*b* is opposed to the inlet port 33 from behind the inlet port 33. The height of a lower air chamber S4 surrounding the support wall 23*b* decreases backward. Thus the distance between the bottom wall 23*b* and the filter assembly 56** decreases backward.

Filter Assembly

Figure 5:
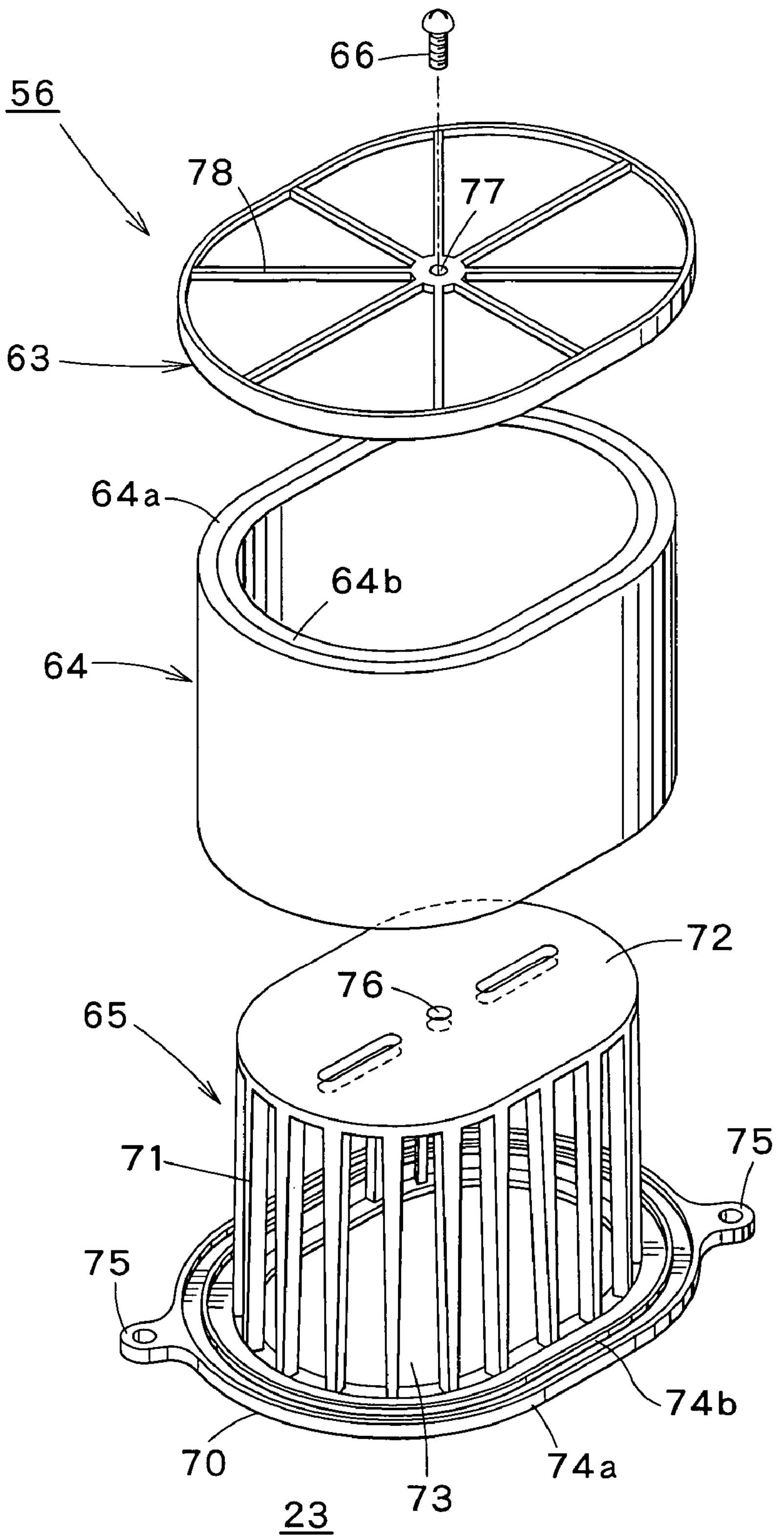
FIG. 5 is an exploded perspective view of a filter assembly included in the air cleaner shown in FIG. 1.

Referring to FIG. 5 showing the filter assembly 56 in an exploded perspective view, the filter assembly 56 includes a cylindrical cleaner element 64 formed from urethane foam sheets, a support frame 65 of a resin, supporting the cleaner element 64 thereon and keeping the cleaner element 64 in a predetermined cylindrical shape, and a flat, resin top cover 63 fastened to the support frame 65 with a bolt 66 to hold the cleaner element 64 in place on the support frame 65. The cleaner element 64 has an oblong shape extending in the back-and-forth direction in a horizontal plane. The cleaner element 64 is a two-layer structure consisting of a coarse outer layer **64*a* and a fine inner layer 64*b***.

The support frame 65 has an annular base 70 on which the cleaner element 64 is supported, a side wall 71 for keeping the cleaner element 64 in the shape of an elliptic cylinder and a top wall 72. The base 70, the side wall 71 and the top wall 72 are formed integrally.

The side wall 71 is a grating. The side wall 71 is provided with a plurality of slit air passages 73 circumferentially arranged at fixed intervals. The slit air passages 73 extend between the base 70 and the top wall 72. The base 70 is provided integrally with ribs **74*a* and 74*b* extending along the outer edge of the base 70 and in a middle part, with respect to the width, of the base 70, respectively, to determined the position of the lower end of the cleaner element 64 on the base 70. The base 70 is provided with a pair of opposite tabs 75. The tabs 75 are fastened to the lower case member 23. A threaded hole 76 is formed in a central part of the top wall 72. The bolt 66 is screwed in the threaded hole 76 to fasten the top cover 63 to the support frame 65**.

The top cover 63 is a flat resin plate of an oblong shape corresponding to that of a horizontal section of the cleaner element 64 having a central boss provided with a through hole 77 and radial arms 78 radially extending from the central boss.

Figure 7:
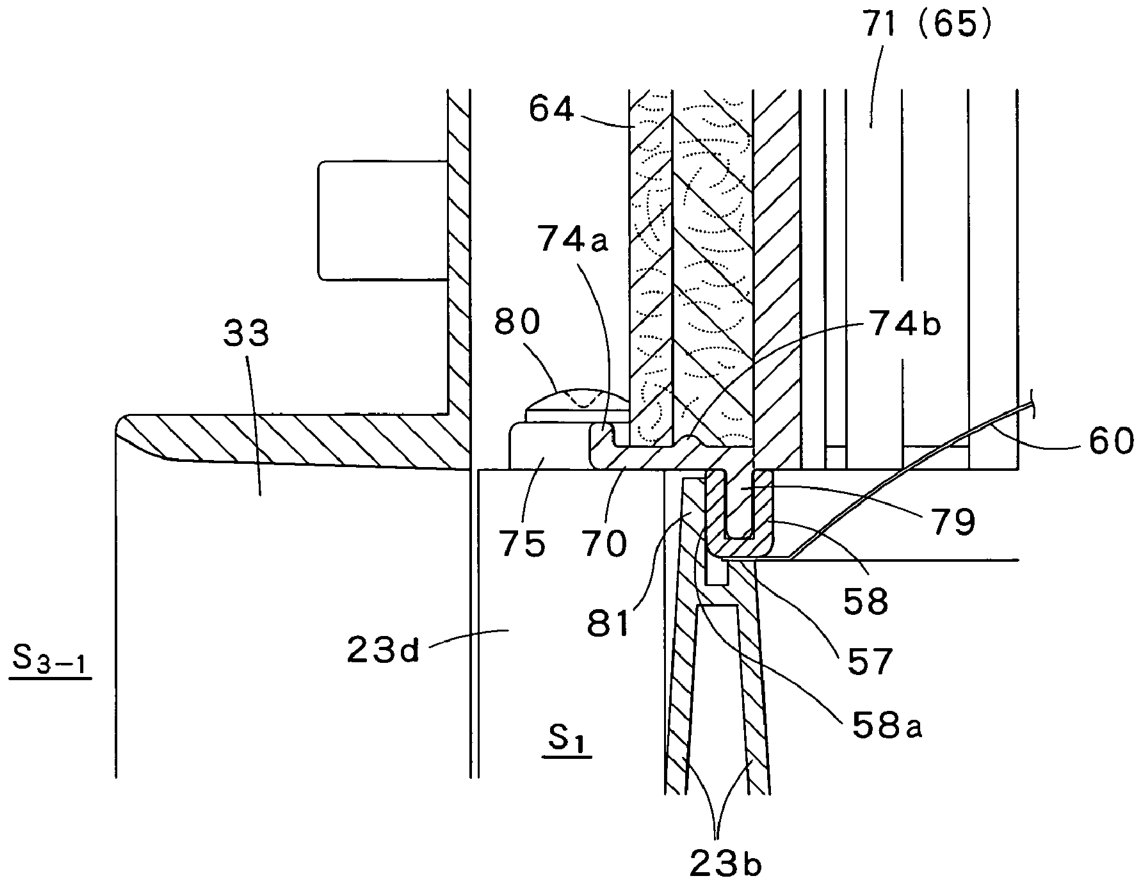
FIG. 7 is an enlarged view of a part indicated by the arrow VII in FIG. 4.

Referring to FIG. 7, the base 70 of the support frame 65 is integrally provided on its lower surface with a downward protruding rib 79 extending along the entire perimeter of the base 70. The rubber trim seal 58 having a U-shaped cross section is put on the rib 79. An upward protruding oblong rib 81 is formed on the radially outer side of the installation seat 57 of the support wall 23*b* along the entire perimeter of the installation seat 57. The rib 81 and the installation seat 57 are spaced apart by an oblong groove.

The base 70 of the support frame 65 is seated on the installation seat 57. The trim seal 58 and the peripheral part of the flame arrester 60 are held between the installation seat 57 and the base 70. The tabs 75 are fastened to the lower case member 23 with bolts 80. The outer side surface of the trim seal 58 is pressed against the inner side surface of the upward protruding oblong rib 81. Thus the trim seal 58 is kept in a predetermined cylindrical shape and is uniformly compressed.

Figure 6:
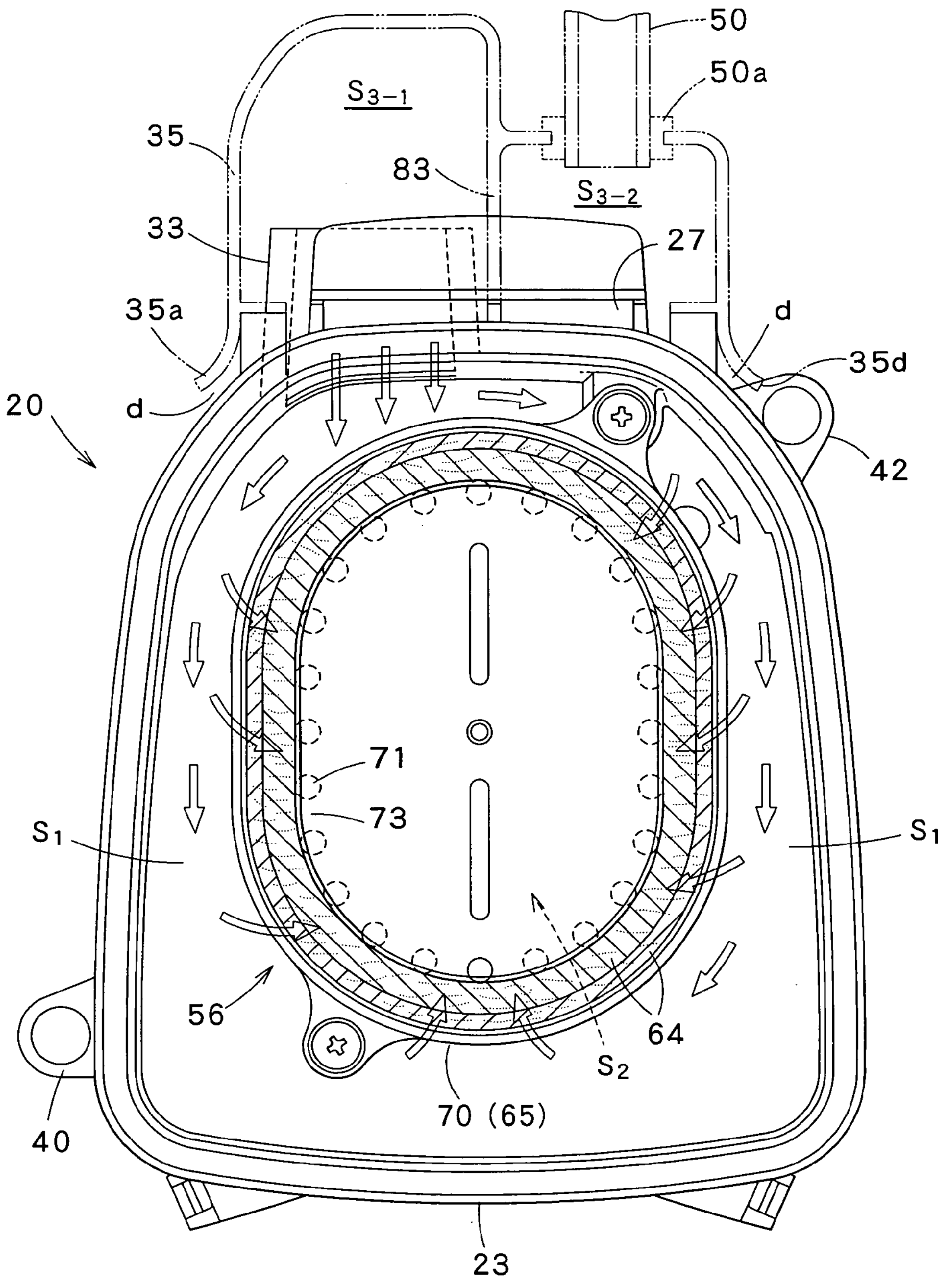
FIG. 6 is a plan view of the air cleaner shown in FIG. 1, in which an upper case member is removed.

FIG. 6 is a plan view of the air cleaner 20, in which the upper case member 22 is removed. An outer air chamber S1, namely, an intake air chamber, is formed around the filter assembly 56 along the entire perimeter of the filter assembly 56 so as to be connected to the lower air chamber S4 shown in FIG. 4. An inner air chamber S2, namely, clean air chamber, is formed in the filter assembly 56.

Air Intake Structure of Air Cleaner

Figure 8:
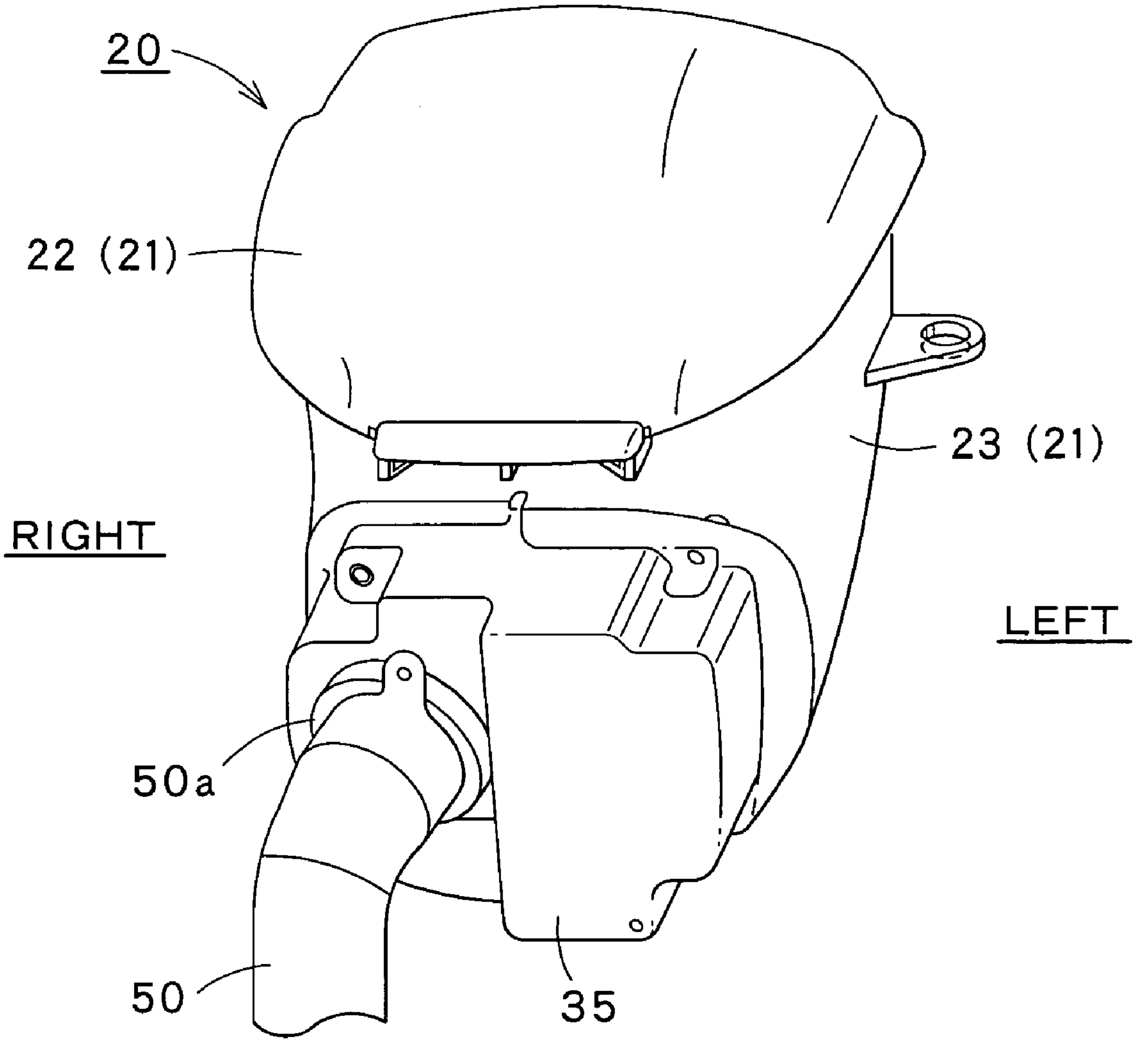
FIG. 8 is a perspective view of the air cleaner shown in FIG. 1.
Figure 9:
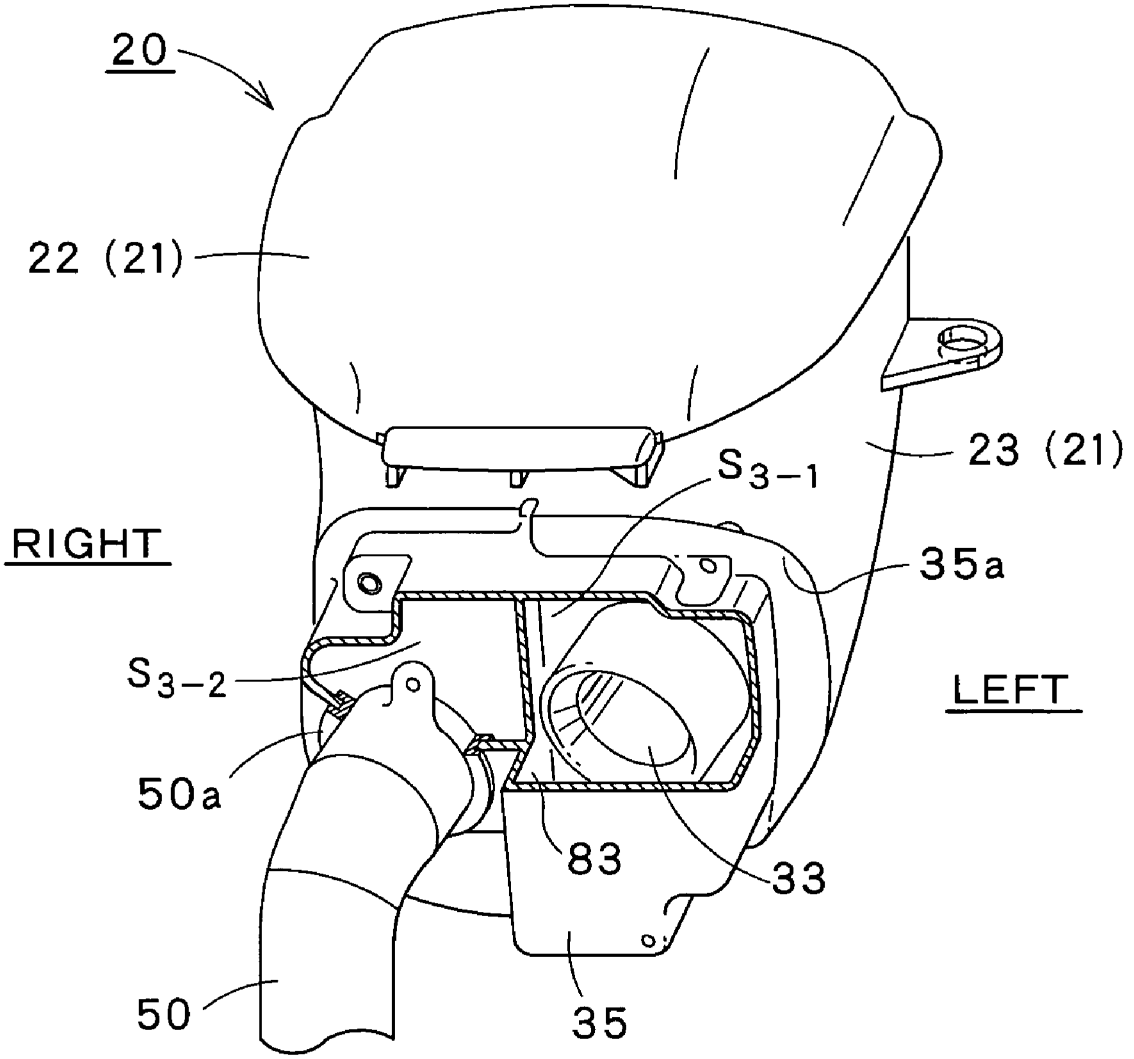
FIG. 9 is a partly cutaway perspective view, similar to FIG. 8, of the air cleaner.
Figure 10:
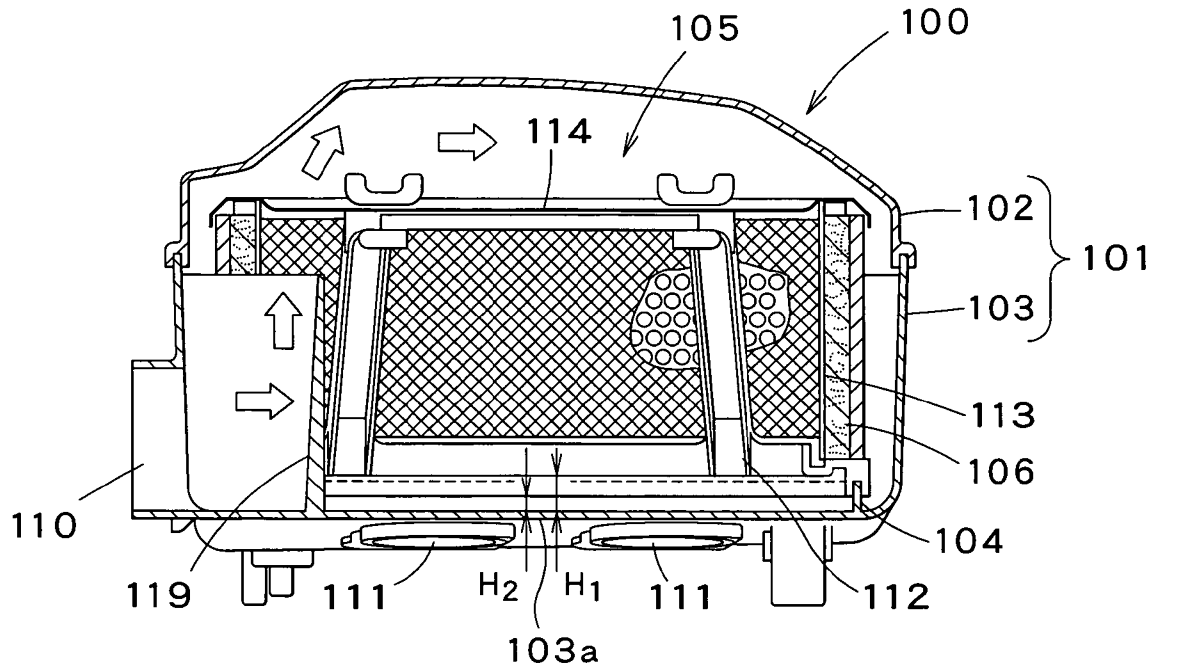
FIG. 10 is a fragmentary vertical sectional view of an air cleaner as a related art.

FIG. 8 is a perspective view of the air cleaner 20 and FIG. 9 is a perspective view of the air cleaner 20 on which an upper front part of the air intake case 35 is cut away. Referring to FIG. 9, the interior of the air intake case 35 is divided into a cooling air chamber S3-2 on the right side of the vehicle and an intake air chamber S3-1 on the left side of the vehicle by a partition wall 83 formed integrally with the intake air case 35. The cooling air duct 50 is connected to the cooling air chamber S3-2 to induce cooling air for cooling the V-belt continuously variable transmission 41 through the cooling air chamber S3-2. The cooling air duct 50 is connected to the air intake case 35 by a rubber sealing ring 50*a*. One part, corresponding to the intake air chamber S3-1, of the front wall of the intake air case 35 lies ahead of a plane containing the other part, corresponding to the cooling air chamber S3-2, of the front wall of the intake air case. The intake air chamber S3-1 has a volume greater than that of the cooling air chamber S3-2. The inlet port 33 of the air cleaner projects into the air intake chamber S3-1.

As shown in FIG. 4, the air intake case 35 is fastened to a boss 86 formed on the lower case member 23 with a plurality of bolts 85. As mentioned above, the gap d is formed between the end surface of the open rear end 35*a* of the air intake case 35 and the outer surface of the side wall of the lower case member 23. Air flows through the gap d into the air intake chamber S3-1 and the cooling air chamber S3-2.

Procedure for Changing Cleaner Element (1) Referring to FIG. 2, the locking mechanism, not shown, locking the rear end of the seat 8 is unfastened, the hook 29 is disengaged from the bar 31, and the seat 8 is removed to expose the clamp member 28 clamping the respective rear end parts of the case members 22 and 23. Then, the clamping member 28 is removed, the locking projection 26 formed integrally with the upper case member 22 is extracted from the locking hole 27 formed in the front end part of the lower case member 23, and the upper case member 22 is removed.

Figure 11:
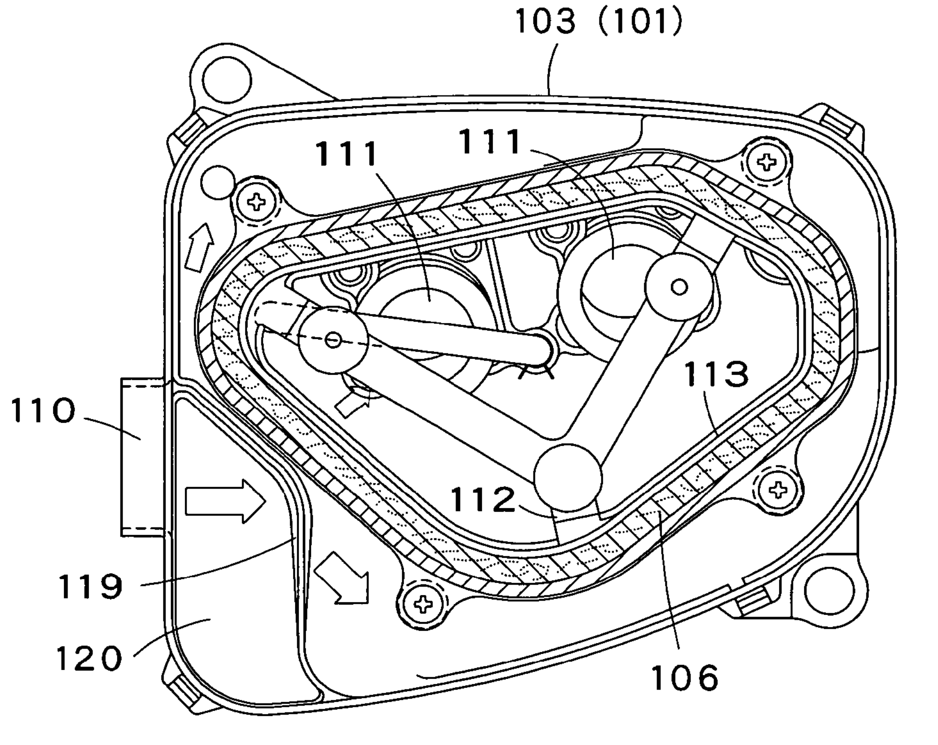
FIG. 11 is a sectional view, in a horizontal plane, of the air cleaner shown in FIG. 10.
Figure 12:
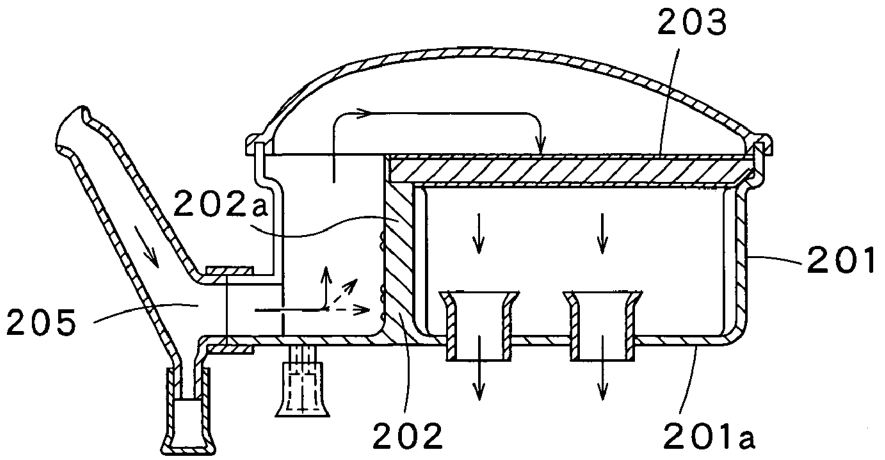
FIG. 12 is a fragmentary vertical sectional view of another air cleaner as a related art.
Figure 13:
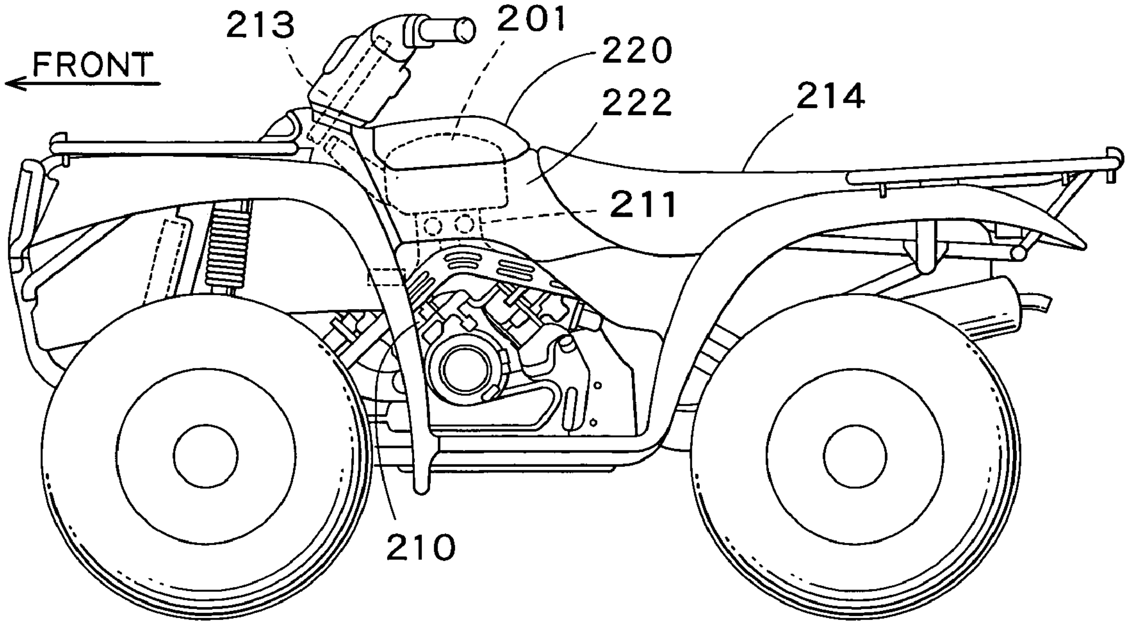
FIG. 13 is a side elevation of a straddle-type four-wheel vehicle provided with the air cleaner shown in FIG. 12.

(2) The bolt 66 is removed and the flat, resin top cover 63 is removed. Thus the cleaner element 64 can be removed. The cleaner element 64 can be removed more easily than the complicated, heavy integral structure of the air cleaner shown in FIG. 11 as a related art.

(3) Subsequently, only the cleaner element 64 is removed from the support frame 65 out by pulling up the cleaner element 64 relative to the side wall 71 of the support frame 65. Then, a new cleaner element 64 is put on the side wall 71 of the support frame 65.

(4) The top cover 63 is put on the top wall 72 of the support frame 65 and is fastened to the top wall 72 with the bolt 66 to press the upper and the lower end of the cleaner element 64 against the top cover 63 and the base 70.

Change of Flame Arrester

A peripheral part of the flame arrester 60 is held between the base 70 of the support frame 65 and the installation seat 57 of the support wall 23*b*. The flame arrester 60 can be replaced with a new one after removing the support frame 65 from the lower case member 23. Since only the flame arrester 60 can be changed, cost of parts can be saved.

Air Flow in Air Cleaner (1) Referring to FIG. 4, air flows through the gap d between the end surface of the open rear end 35*a* of the air intake case 35 and the outer surface of the side wall of the lower case member 23 into the intake air chamber S3-1 and the cooling air chamber S3-2. Since air is thus taken into the air cleaner 20 through the gap d, entrance of water and mud into the air cleaner 20 can be prevented. Since the gap d corresponds to the entire perimeter of the open rear end 35*a* of the air intake case 35, sufficient air is able to flow into the air cleaner 20.

(2) Air flowed into the intake air chamber S3-1 flows through the inlet port 33 into the lower air chamber S4 of the cleaner case 21 and impinges on the front end of the support wall 23*b* immediately after flowing into the lower air chamber S4. Consequently, water and mud contained in the induced air can be separated from air.

(3) Then, the induced air flows smoothly rearward along the right and the left surfaces of the support wall 23*b* in the lower air chamber S4 because the flowing direction of the induced air is not changed sharply. Then, the induced air flows gradually into the outer air chamber S1 surrounding the filter assembly 56 as the induced air flows rearward in the lower air chamber S4. Thus the induced air is distributed over the outer surface of the filter assembly 56. Part of the induced air flows in a tumbling flow from an upper region above the filter assembly 56 into a front region in front of the filter assembly.

(4) Referring to FIG. 6, as the induced air flows through all parts of the cleaner element 64 of the filter assembly 56 into the inner air chamber S2, the cleaner element 64 filters the induced air. The filtered, induced air flows through the outlet ports 30 (FIG. 2) formed on the bottom wall 23*a* into the air intake pipes 32 of the carburetor.

(5) The induced air flowed into the cooling air chamber S3-2 flows through the cooling air duct 50 into the space covered with the belt cover 48 to cool the transmission 41. The induced air cooled the transmission 41 is discharged outside through the discharge port 51.

The horizontal sectional shape of the cleaner element 64 is not limited to the oblong shape as shown in FIG. 5. The cleaner element 64 may have any suitable horizontal sectional shape, such as an elliptic or circular horizontal sectional shape.

Although the air cleaner 20 in the preferred embodiment shown in FIGS. 1 to 4 is disposed with its bottom wall set horizontally, the air cleaner 20 may be disposed with its bottom wall sloping down forward. The top wall and the bottom wall of the cleaner case 21 may be substantially parallel to each other.

The air cleaner of the present invention is applicable also to the engines of various straddle-type vehicles including motor cycles and to the other engines.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. An air cleaner comprising:

a cleaner case having a bottom wall, a circumferential side wall provided with an air inlet in its lower part, and a support wall formed on the bottom wall inside the circumferential side wall, the support wall varying in height; and a cleaner element having a bottom which is supported on an upper end portion of the support wall, wherein an air chamber is defined by the cleaner case, the support wall, and the cleaner element so as to surround the cleaner element and the support wall, the bottom of the cleaner element being inclined at an angle to the bottom wall of the cleaner case so that a distance between the bottom wall of the cleaner case and the bottom of the cleaner element increases from a side opposite to the air inlet toward an air inlet side.

2. The air cleaner according to claim 1, wherein the support wall is disposed opposite the air inlet such the air impinges on the support wall after passage through the air inlet.

3. The air cleaner according to claim 1, wherein the cleaner case has a sectional shape substantially resembling a trapezoid having a long base on the air inlet side and a short base on the side opposite to the air inlet.

4. The air cleaner according to claim 3, wherein a bottom of the air chamber is set substantially horizontal.

5. The air cleaner according to claim 1, wherein an upper part of the air cleaner is exposed in an upper part of a body frame of a vehicle so as to form a part of an external shape of the vehicle.

6. The air cleaner according to claim 1, wherein the air chamber comprises a lower air chamber surrounding the support wall and an upper air chamber surrounding the cleaner element, the lower air chamber being contiguous to the upper air chamber.

7. The air cleaner according to claim 6, wherein the air chamber is formed in an annular shape.

8. The air cleaner according to claim 6, wherein the cleaner element has an annular outer surface through which air passes to be filtered.

9. The air cleaner according to claim 1, wherein an outer circumferential surface of the support wall is substantially flush with an outer circumferential surface of the cleaner element.

10. The air cleaner according to claim 1, wherein the air inlet is disposed at a level lower than a level where a portion of the cleaner element at the air inlet side is disposed.

11. The air cleaner according to claim 1, further comprising an air intake case disposed in front of the cleaner case so as to cover the air inlet, wherein a gap is formed between an end of the air intake case and an outer surface of the cleaner case so that air is introduced through the gap into an inside of the air intake case.

12. The air cleaner according to claim 3, wherein the cleaner case comprises an upper case member and a lower case member, the upper case member being removably joined to the lower case member.

13. An all-terrain straddle-type four-wheel vehicle comprising:

a steering shaft to which a steering handle is attached;

a seat for a driver, the seat being disposed rearward of the steering shaft in a back-and-forth direction of the vehicle; and the air cleaner according to claim 12, the air cleaner being disposed between the steering shaft and the seat in the back-and-forth direction so that the cleaner case has a front portion which is positioned higher than a rear portion of the cleaner case.

14. An air cleaner comprising:

a cleaner case having a bottom wall, a circumferential side wall provided with an air inlet, and a support wall formed on the bottom wall inside the circumferential side wall, the support wall varying in height; and a cleaner element having a bottom which is supported on an upper end portion of the support wall, wherein right and left gaps are formed between the circumferential side wall and the support wall when viewed in a direction in which air is introduced through the air inlet, and an air chamber is defined by the cleaner case, the support wall, and the cleaner element so as to surround the cleaner element and the support wall.

15. The air cleaner according to claim 14, wherein a front portion of the support wall at an air inlet side is configured to divide the introduced air into right and left streams with respect to a flowing direction of the introduced air when the introduced air impinges on the front portion of the support wall so that a divided air is guided rearward of the front portion of the support wall.

16. The air cleaner according to claim 15, wherein a distance between the bottom wall of the cleaner case and the bottom of the cleaner element increases from a side opposite to the air inlet toward the air inlet side.

17. The air cleaner according to claim 1, wherein the cleaner element and the support wall are cylindrical in shape.

* * * * *